UNITED STATES PATENT OFFICE.

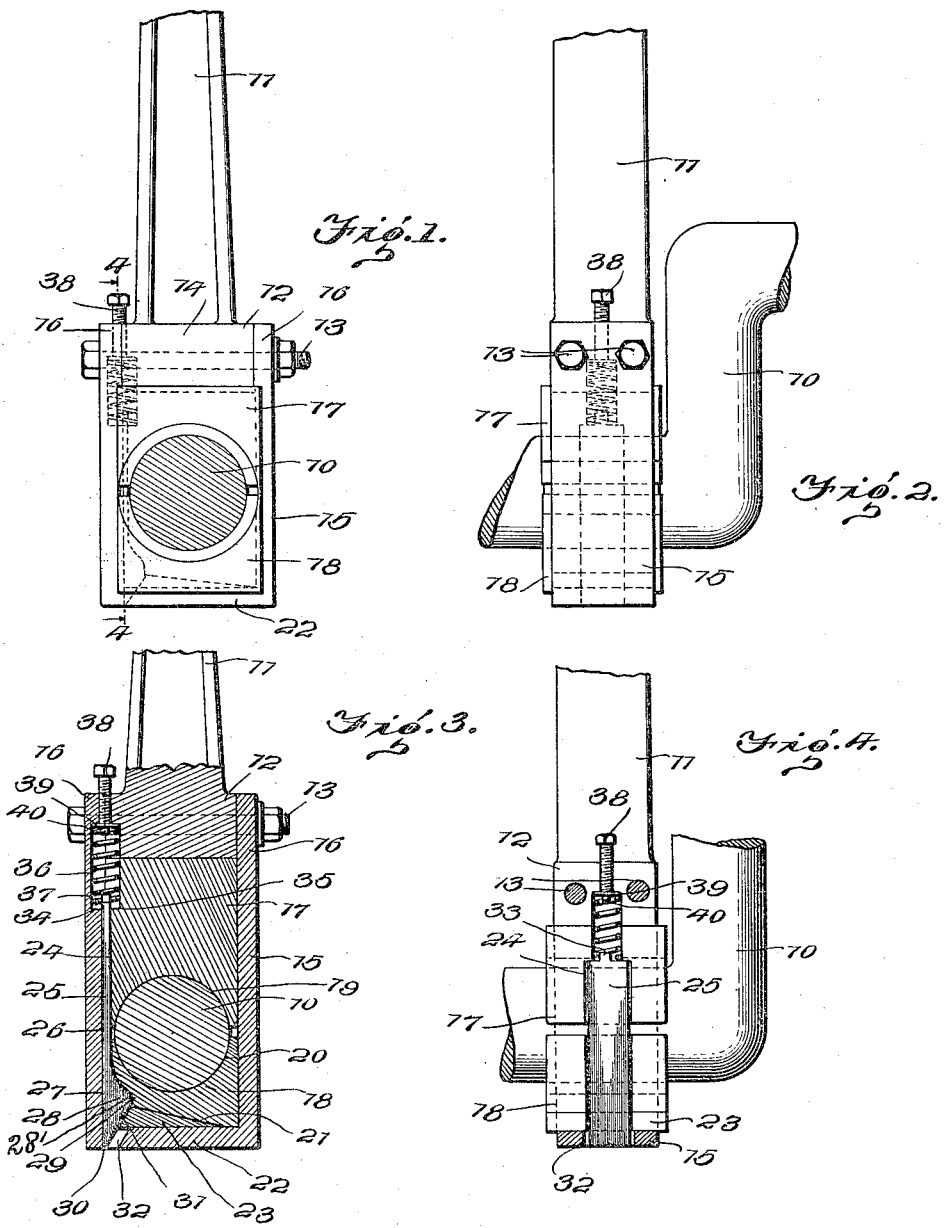

LEO E. OHR, OF BILOXI, MISSISSIPPI.

BEARING FOR CONNECTING-RODS.

1,139,216.  Specification of Letters Patent.  Patented May 11, 1915.

Application filed April 4, 1913. Serial No. 758,976.

*To all whom it may concern:*

Be it known that I, LEO E. OHR, citizen of the United States, residing at Biloxi, in the county of Harrison and State of Mississippi, have invented certain new and useful Improvements in Bearings for Connecting-Rods, of which the following is a specification.

This invention relates to an improvement in bearings for connecting rods.

The primary object of the invention is to provide a bearing which will form a connection between the connecting rod and the crank of an engine, with means for exerting a constant pressure on the crank whereby a snug and effective bearing is provided.

A further object of the invention is to provide a connecting rod with means disposed to embrace a crank which may be adjusted to increase or diminish the grip on the crank.

A still further object of the invention is to provide a bearing which will take up wear, there being resilient means provided for constantly forcing the members which grip the crank in contact with the same.

For a full understanding of the invention reference is to be had to the following description and accompanying drawing in which:—

Figure 1 is a side elevation. Fig. 2 is a front elevation. Fig. 3 a vertical section, and Fig. 4 a section taken on the line 4—4 of Fig. 1.

Corresponding and like parts are referred to in the following description and indicated in all the views of the accompanying drawing by the same reference characters.

In the drawing 10 designates the crank-shaft of the engine to which the connecting rod 11 is coupled.

Broadly the invention contemplates the provision of a connection between the rod 11 and the crank which will include a plurality of bearing members each of which partially embraces the crank and both of which may be simultaneously forced in contact with the crank by a wedge constantly acted upon by a resilient device, the tension of which may be easily regulated. The connecting rod 11 is provided with bosses 12 which are bored to receive bolts 13, the bolts passing entirely through the enlarged portion 14 of the rod. A substantially U-shaped yoke 15 embraces the enlarged terminal 14 of the rod, its terminals 16 being each provided with a plurality of apertures through which the bolts 13 extend, the bolts thus securely clamping the yoke or frame 15 to the rod. Arranged within the yoke through which the crank 10 passes are a plurality of bearing blocks 17 and 18. The block 17 contacts with the terminal of the rod 11, its end remote from the rod 11 being concaved as at 19 to agree with the curvature of the crank 10. The block 18 is also provided with a concaved face 20 which receives the crank 10. The end 21 of the block 18 adjacent the intermediate portion 22 of the yoke 15 is cut obliquely and a wedge-member 23 is interposed between the obliquely cut base of the member 18 and the intermediate portion 22 of the yoke.

Both of the members 17 and 18 are formed with grooves 24, the groove 24 of one member alining with the groove of the other member. These grooves receive a wedge 25, the face 26 of the shank of which is flat and contacts with the inner face 27 of one of the wide walls of the yoke. The wedge-member 25 terminates in a head 28 which is provided with an integral rounded shoulder 28'. The block 18 is provided with a recess 29 which forms a continuation of its groove 24, the recess receiving the shoulder 28' of the head 28. The face 30 of the head 28 is beveled and disposed to contact with the face 31 of the wedge 23, movement of the wedge 25 longitudinally of the yoke forcing the wedge-member 23 transversely of the yoke, that is, in contact with the lower obliquely cut face of the block 18, the movement of the wedge in the slot 24 of the member 17 forcing it in contact with the crank-shaft. The intermediate portion 22 of the yoke is provided with an opening 32 which receives the terminal of the wedge 25, the wedge being permitted to move beyond the yoke, its terminal projecting through said opening.

The upper terminal of the wedge 25 is provided with a stud 33 which extends beyond the shoulders 34 and 35 of the yoke and block 17 formed by reducing said members. These members are reduced to provide a pocket 36 for the coil spring 37. The enlarged end portion 14 of the rod 11 is also reduced to form a continuation of this pocket and passing transversely through the portion 14 and extending within said pocket is a screw 38 carrying at its terminal a disk 39 provided with a stud 40. The terminal convolutions of the spring 37 embrace the studs of the wedge-member 25 and the disk 39, the spring exerting a constant pressure on the wedge member 25 to force it in contact with the blocks 17 and 18 and the wedge 23. This constant pressure on the wedge 23 which, as it will be noted, may be regulated by adjusting the set-screw 38, at all times forces the members 17 and 18 in contact with the crank 10. It will be noted by this arrangement that the constant pressure on the members 17 and 18 will effectually take up wear. The danger of breakage will thus be practically eliminated because of the fact that the bearing will fit snugly at all times, and the action of the shaft against the bearing will be uniform, thus avoiding the pounding which crystallizes the bearing parts and frequently causes the breakage of the bearings of the ordinary form.

Having thus described the invention what is claimed as new is:—

A bearing for connecting rods including a rod, a yoke carried by the rod, bearing blocks arranged within the yoke and disposed to embrace a crank shaft, the first of said blocks being provided with a longitudinally extending recess, the second of said blocks being provided with an arcuate recess, a wedge including a shank and a head member, said head member being provided with a rounded shoulder, the shank being slidably received within the longitudinal recess of the first-mentioned block, said shoulder being received in the initial position of the blocks in the arcuate recess of the second-mentioned block, and a second-wedge member interposed between the terminal of the yoke and the adjacent face of the second-mentioned bearing block, the terminal of the second wedge member being engageable by the adjacent face of the said wedge head, and yieldable means engaging the shank of the first-mentioned wedge for holding the head thereof in engagement with the second-mentioned wedge.

In testimony whereof I affix my signature in presence of two witnesses.

LEO E. OHR. [L. S.]

Witnesses:
H. H. RORF,
A. S. GNEUFLO.

Copies of this patent may be obtained for five cents each, by addressing the "Commissioner of Patents, Washington, D. C."